May 3, 1966  E. SÖDERMAN  3,248,796
APPARATUS FOR MEASURING THE LENGTH OF INTESTINES
Filed Feb. 20, 1963  3 Sheets-Sheet 1

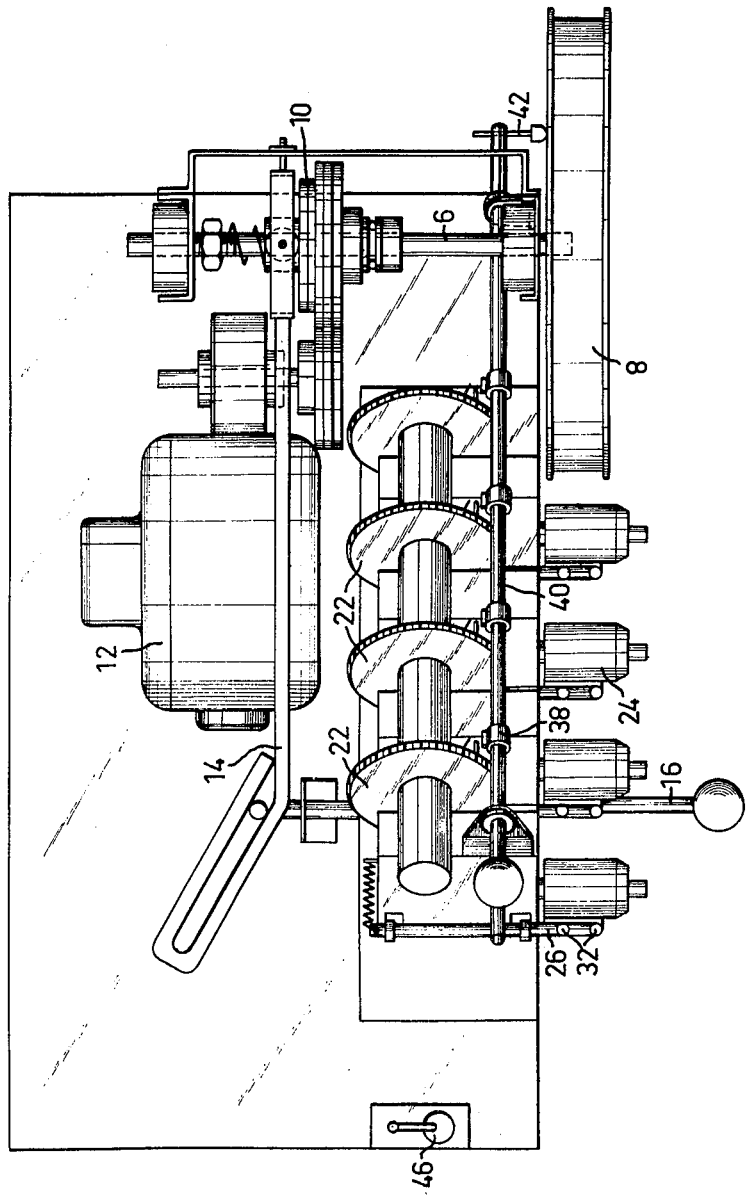

United States Patent Office 3,248,796
Patented May 3, 1966

3,248,796
APPARATUS FOR MEASURING THE LENGTH OF INTESTINES
Einar Söderman, Sundsvall, Sweden, assignor to Kontrollhudar Andelsslakteriernas Fören. U.P.A., Malmo, Sweden, trading association with limited liability
Filed Feb. 20, 1963, Ser. No. 259,948
Claims priority, application Sweden, Dec. 18, 1962, 13,623/62
6 Claims. (Cl. 33—132)

This invention relates to measuring devices.

The various working steps, such as the inspection and measurement of caliber and length, in the preparation of intestines have hitherto almost always necessitated manual work, which is a great strain and in time may cause occupational diseases. For this reason an efficient and exact technical aid is of great importance for carrying out these working steps.

The instant invention which relates to an apparatus for measuring the length of intestines, particularly pig and sheep intestines, provides not only a very exact and efficient measuring of the length of intestines but also significantly facilitates the calibration and inspection in that the apparatus advances the intestines to stations where these working steps are carried out. The characteristic features of the invention are that several measuring wheel devices one for each caliber of intestines are disposed between a supply of intestines and a draw wheel which is preferably connected with an electric motor via a manually operable slip clutch and which is adapted to draw intestines of a predetermined caliber over the respective associated measuring wheel device, and that the measuring wheel devices are each adapted to hold the draw wheel against rotation while the slip clutch is slipping, after a predetermined length of the respective caliber of intestines has been measured.

These and further features of the invention will become apparent from the following description of an embodiment of the invention, reference being made to the accompanying drawings in which:

FIG. 3 is a section on line II—II in FIG. 1.

Figure 1:
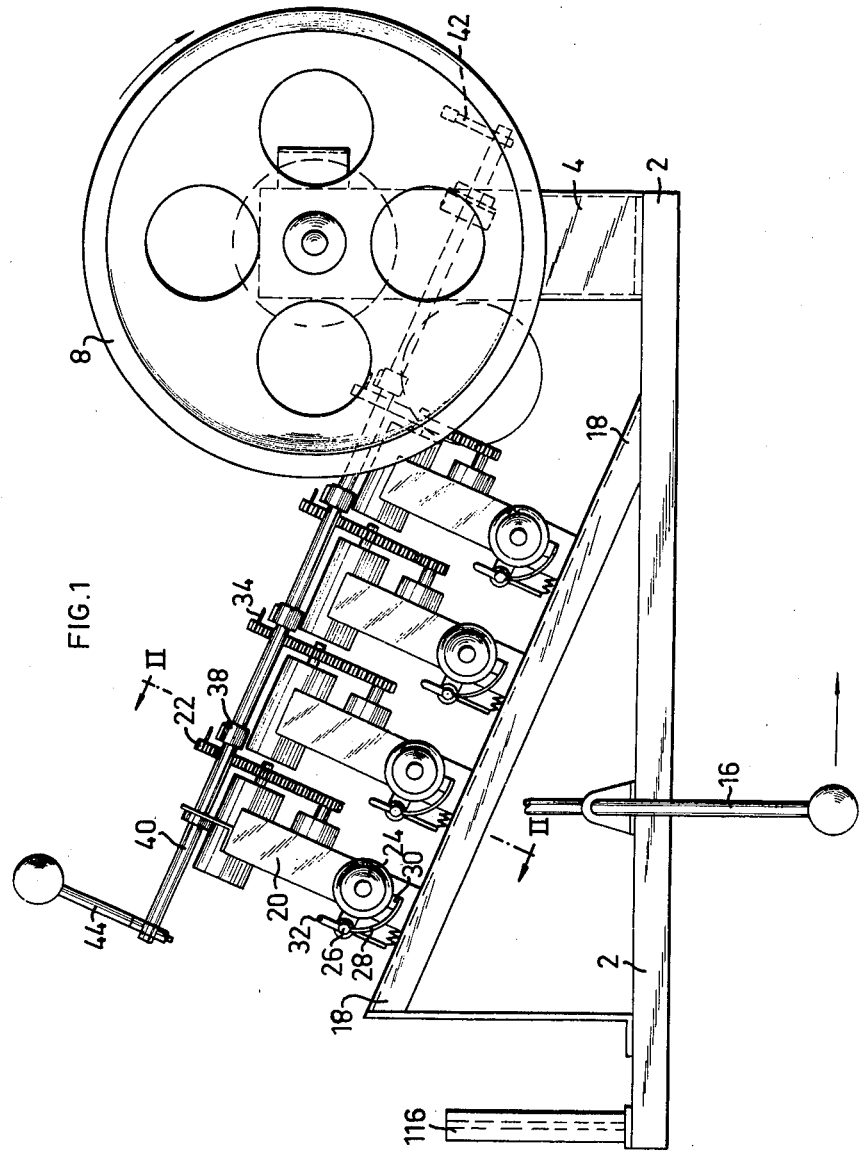
FIG. 1 is a side elevational view of an apparatus for measuring the length of intestines.
Figure 2:
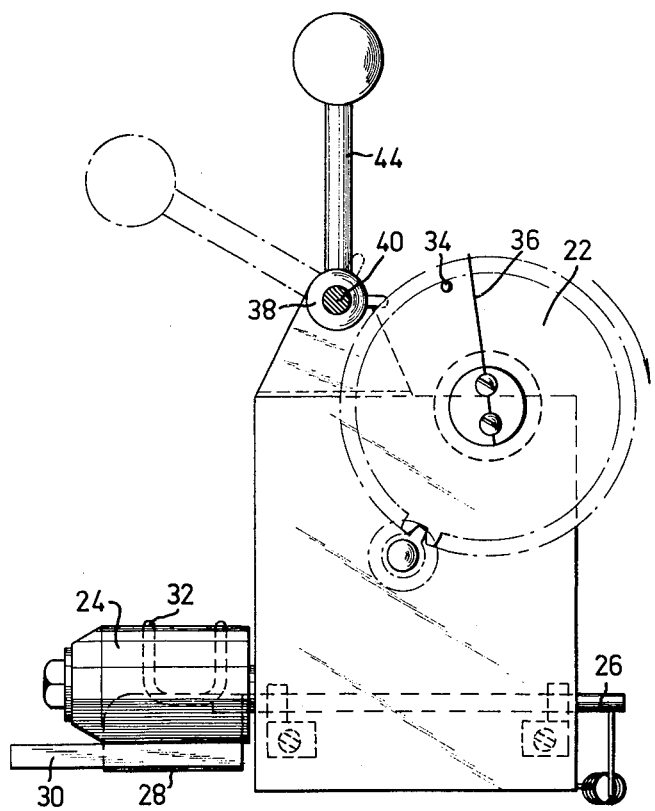
FIG. 2 is a plan view of said length measuring apparatus.

A bottom plate 2 (see FIG. 1) supports the length measuring apparatus and at one end has secured to it trestles 4 supporting a drive shaft 6 for a draw wheel 8. Said draw wheel 8 is approximately in the shape of a V-belt pulley the inner portion of which is filled with a friction composition, such as foam plastic or the like. The drive shaft 6 of the draw wheel 8 is connected via a slip clutch 10 (FIG. 3) with a motor 12 which is preferably electric. Extending from the slip clutch, which can be any conventional device consisting of members adapted to transmit a rotary force but which will slip when movement of one of the members is impeded, is a control rod 14 which has one end formed with an elongated loop with which an operating member 16 is engaged. The operating member 16 is pivotally mounted on the bottom plate 2. Mounted on said bottom plate is a body member 18 which has an oblique position relative to the horizontal and carries several measuring wheel devices disposed in a row and each intended for a caliber of intestines. Each of said measuring wheel devices comprises a measuring wheel 24 connected via a transmission 20 with a counting wheel 22. In front of each of the measuring wheel device there is disposed a shaft 26 which is pivotally mounted on the transmission housing, and at one end of said shaft 26 there is disposed a guide plate 28 with a curved brake means 30 secured thereto, and a guide means 32, while a spring 50 for urging the brake means against the measuring wheel is fixed to the other end of the shaft 26. The counting wheel 22 has an actuating means comprising a pin 34 and a straight spring wire 36 one end of which is fixed to the center of the wheel and the other end of which is slightly ahead of the pin, as seen in the contemplated direction of rotation of the wheel. The actuating means of the measuring wheel devices are situated in such a way that once for each revolution of the counting wheel they will engage corresponding abutment means 38 located on a shaft 40 extending along the measuring wheel devices and mounted on one trestle 4 and by a bracket at one end of a measuring wheel device. Secured to one end of the shaft is an engagement element 42 which is adapted to hold the draw wheel 8 against rotation while the slip clutch 10 is slipping, and at the other end of the shaft there is provided a reset handle 44. Cutting means 46 for cutting the intestines is secured to the end of the bottom plate 2 facing away from said trestles 4.

The transmission ratio of the measuring wheel 24 and counting wheel 22 is such that the counting wheel makes one revolution while the measuring wheel makes so many revolutions as it is caused to rotate by an intestine of 100 yards in length.

After calibration and sorting of the intestine it is entered for measuring through the guide means 32 and between the brake means 30 and the measuring wheel 24 at the measuring wheel device corresponding to the intestine caliber. Then the intestine is drawn manually up to and over the draw wheel 8 with which the intestine obtains a sufficient frictional engagement due to the friction composition therein in order that it may be advanced by the draw wheel when the electric motor drives said wheel via the slip clutch. The brake means 30 presses the intestine in such a manner against the measuring wheel 24 that said wheel will rotate corresponding to the length of intestine moving by it. Being connected over the transmission 20 with the counting wheel 22, the measuring wheel 24 will cause said counting wheel 22 to rotate corresponding to said measuring wheel, thereby measuring the length of the intestine. When the counting wheel has made one revolution the spring wire 36 will engage the corresponding abutment means 38 on the shaft 40 and remain engaged therewith until the pin 34 engages the spring wire and causes the shaft 40 to rotate in such a way that the abutment means is moved out of the path of the spring wire which due to the spring tension will swing forwardly away from the pin 34, and upon resetting of the shaft 40 the spring wire cannot engage the abutment means until the counting wheel has made a further revolution. At the swinging movement of the shaft the engaging element 42 at the end thereof will be swung against and retain the draw wheel 8 while the slip clutch is slipping. As the measuring of a predetermined length of the respective caliber of intestines as a rule is effected in sections the measuring wheel devices will store the size of the length of intestine measured until an intestine having the same caliber is found, whereby the predetermined length of intestine can be gradually obtained and measured in this manner. The measuring wheel devices also take into consideration backward drawing of a given length of intestine. In order to draw an intestine backward first the drive connection between the electric motor 12 and the draw wheel 8 is disconnected by actuation of the operating means 16 engaging the control rod 14. The counting wheel 22 is then moved backward by the backward drawing of the intestine, corresponding to the backward rotation of the measuring wheel. The measuring wheel devices thus are capable of both adding and subtracting.

What is claimed is:

1. Apparatus for measuring lengths of intestines comprising a draw wheel adapted for engaging and displacing the intestines lengthwise, a plurality of measuring wheels corresponding to different calibres of intestines and across which intestines can be selectively drawn by said draw wheel, measuring means coupled to each of the measuring wheels and adapted to measure the length of intestines drawn across the corresponding measuring wheel by registering the rotation of the latter, said measuring means comprising a counting wheel, a pin on said counting wheel and a transmission for each measuring wheel, each transmission coupling the corresponding counting wheel to one of the measuring wheels, a source of power, a slip clutch coupling said source to said draw wheel to drive the latter, and control means including a rotatable shaft extending along the counting wheels, abutment means on the shaft adjacent each of the counting wheels and adapted for being engaged by the pins, as the counting wheels are rotated, to rotate the shaft, and means on the shaft adapted to be brought into engagement with the draw wheel upon rotation of the shaft, to prevent rotation of the latter when a predetermined quantity of intestines has been drawn across any one of the measuring wheels.

2. Apparatus as claimed in claim 1 comprising resilient guide means adjacent each measuring wheel to hold intestines against the latter.

3. Apparatus as claimed in claim 2 comprising means to disengage the source of power from the draw wheel, the draw wheel and measuring wheels all being rotatable in opposed directions and the measuring means being adapted for adding and substracting intestines' lengths depending on the direction of rotation of the measuring wheels.

4. Apparatus as claimed in claim 3 wherein the transmission means cause the counting wheels to make single rotations for a predetermined length of intestines.

5. Apparatus as claimed in claim 4 wherein the measuring and draw wheels have parallel axes.

6. Apparatus as claimed in claim 5 wherein the source of power is an electric motor.

References Cited by the Examiner
UNITED STATES PATENTS

| | | | |
|---|---|---|---|
| 533,312 | 1/1895 | McCombs | 33—136 |
| 1,103,856 | 7/1913 | Alanko et al. | 33—132 |
| 1,846,850 | 12/1928 | Dixon | 192—139 |
| 1,913,829 | 6/1933 | Brock | 33—132 |

LOUIS R. PRINCE, *Primary Examiner.*

ISAAC LISANN, DAVID SCHONBERG, J. REJILIAN,
*Assistant Examiners.*